July 27, 1965

R. J. SPARLING 3,196,742

MICROSCOPE OPTICAL SYSTEM INCLUDING
CONCAVE REFLECTOR ELEMENT

Filed Aug. 29, 1962

INVENTOR.
ROBERT J. SPARLING
BY
ATTORNEYS

July 27, 1965
R. J. SPARLING
3,196,742
MICROSCOPE OPTICAL SYSTEM INCLUDING
CONCAVE REFLECTOR ELEMENT
Filed Aug. 29, 1962
3 Sheets-Sheet 2
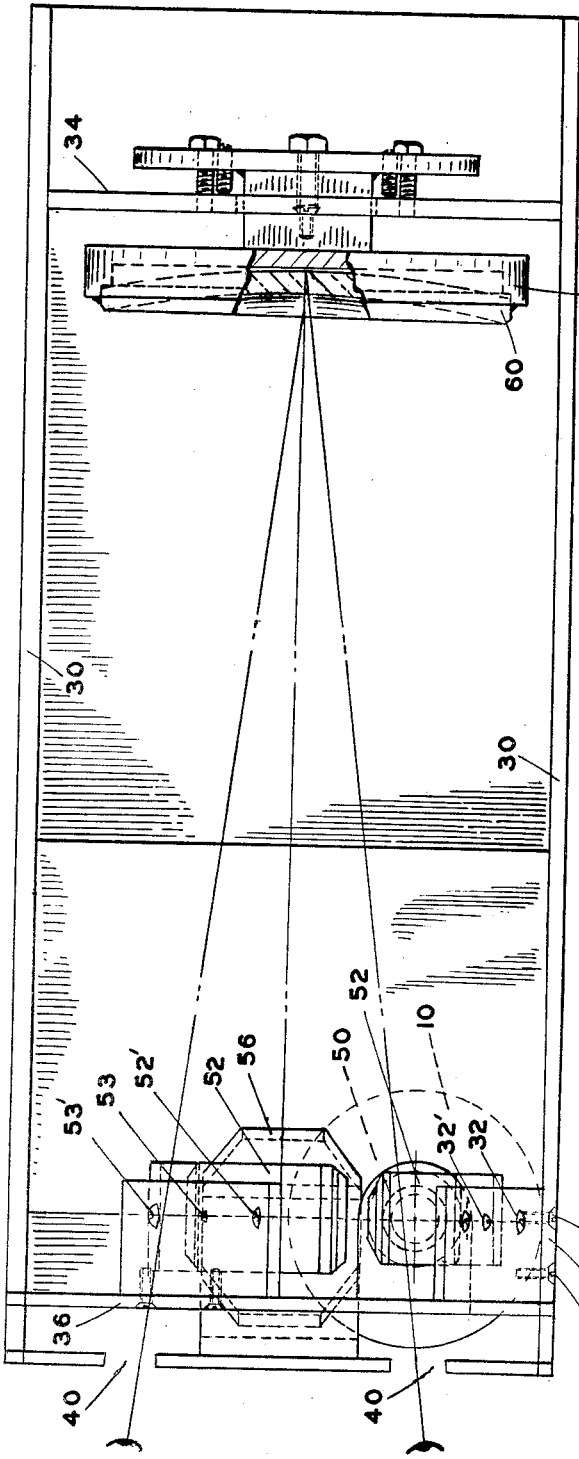
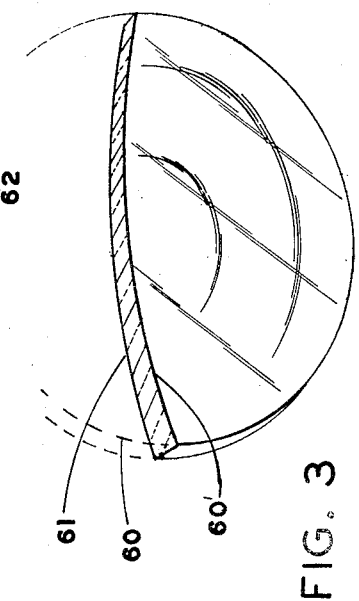
FIG. 3
FIG. 2
INVENTOR.
ROBERT J. SPARLING
BY
ATTORNEYS July 27, 1965

R. J. SPARLING 3,196,742

MICROSCOPE OPTICAL SYSTEM INCLUDING
CONCAVE REFLECTOR ELEMENT

Filed Aug. 29, 1962

INVENTOR.
ROBERT J. SPARLING
BY
ATTORNEYS

United States Patent Office 3,196,742
Patented July 27, 1965

3,196,742
MICROSCOPE OPTICAL SYSTEM INCLUDING CONCAVE REFLECTOR ELEMENT
Robert J. Sparling, Pittsfield, Mass., assignor to Bausch & Lomb Incorporated, Rochester, N.Y., a corporation of New York
Filed Aug. 29, 1962, Ser. No. 220,225
1 Claim. (Cl. 88—39)

This invention relates to an optical element for use with a magnifier or the like and more particularly to an optical element which produces a stereoscopic image.

An increased demand for binocular type stereoscopic microscopes has produced numerous approaches to gain a competitive advantage in a highly competitive commercial field. There are, for example, many presently available devices incorporating stereoscopic viewing, ranging from relatively simple, inexpensive devices to the precision microscopes which are suitable for research laboratories or for industrial purposes.

The present invention is particularly applicable to relatively inexpensive magnifiers of the type used for elementary instruction wherein there is relatively little need for a complex precision instrument. Even though there is relatively little importance on the complex precision optics such as those required by research type instruments, it is still particularly desirable to include binocular vision so that the magnified image can be viewed with both eyes.

Advantageously a device made according to the present invention includes means for producing a stereoscopic image. The three dimensional image produced is particularly suitable for elementary instruction. Furthermore the device is relatively inexpensive to manufacture, relatively durable in use, simple in design and may be used by relatively small children.

Another advantageous feature incorporated in one embodiment of the invention tends to overcome a problem associated with the relatively large differences in the distances between the person's eyes. This feature also tends to alleviate discomfort of a viewer caused by ocular muscle anomalies such as esophori (tending inward) or exophoria (tending outward). In order to further facilitate the use of a magnifier according to the present invention means are provided for horizontal viewing of an object placed on a vertical axis i.e. where the stage lies in a horizontal plane and may be adjusted along the vertical axis. In accordance with this provision means are also provided for producing an unreverted erect image.

It is contemplated by the present invention to include a novel optical element in a magnifier or the like. The novel element comprises two curved surfaces defining a concave convex element of increasing thickness. A semi-transparent coating is applied on a first one of the surfaces, i.e. on the concave portion of the element, and, a reflective coating is applied to a second of the surfaces, i.e. the convex surface of the element. The concave surface is positioned to receive an incident light ray, and to produce a focusing effect. A portion of the incident light ray is reflected along a first axis by the semi-transparent coating, and the transmitted portion of the incident rays are reflected by the reflective coating on the second surface along a second diverging axis.

An optical system including a novel element, such as the one described in the preceding paragraph, also includes means for forming an unreverted erect magnified image of an object in space. The unreverted erect magnified image formed gives the effect of having three dimensional or stereoscopic characteristics. Furthermore this pseudo stereoscopic effect is obtained at a relatively small cost.

The invention will now be described in more detail in connection with the accompanying drawings; in which, FIG. 1 is a cross sectional view of a magnifier according to the present invention;

FIG. 2 is a top plan view of the magnifier shown in FIG. 1 but taken without the outer housing shown in FIG. 1;

FIG. 3 is a perspective view partly in section of an optical element according to the invention;

Figure 1:
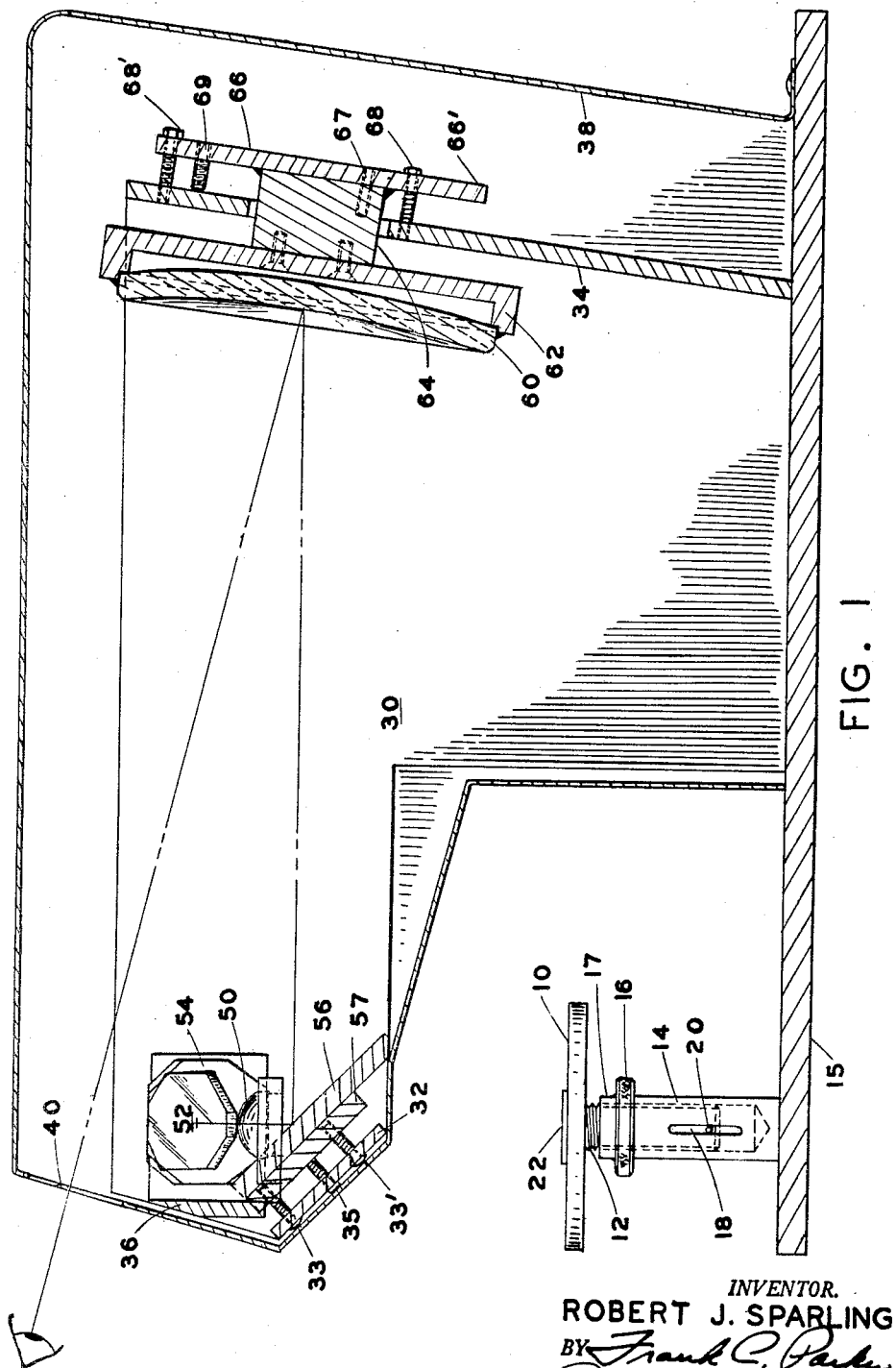

A stage 10 shown more clearly in FIG. 1 is fixed to a threaded actuating shaft 12 which extends downwardly from the stage 10 and received within a sleeve 14. The sleeve 14 is fixed to and extends upwardly from a base 15. A radial knob 16 having a knurled edge thereon is threadedly received on the shaft 12. The radial knob 16 is positioned adjacent to and in contact with one end of the sleeve 14. The knob 16 and a pilot nut 17 which is fixed to the knob 16 to extend the thread length of the knob 16 are adapted to raise or lower the stage upon rotation of the knob 16. Means defining a vertical slot 18 in the threaded shaft 12 cooperate with a pin 20 to prevent the shaft 12 from turning within the sleeve 14 upon rotation of the knob 16. Therefore, rotation of the knob 16 advances the screw threads to thereby raise or lower the stage along its vertical axis. The weight of the stage assembly forces the stage downwardly to thereby force the knob 16 against the end of the sleeve 14.

Supporting means 30 includes brackets 32 and connecting webs 34, 36 which interconnect the laterally extending walls of the supporting means 30. The supporting means 30 extends upwardly from the base 15 and supports the optical components of the system. An outer housing 38 engulfs the optical components and support means 30 and includes a pair of apertures 40 which comprise the binocular viewing portion of the device.

A beam deviater is shown more clearly by the schematic perspective view in FIG. 3. A specimen 22 on the stage 10 is imaged by means of a lens 50. The beam deviater which is the presently preferred embodiment is a mirror system including three mirrors 52, 54 and 56. The mirror 52 is disposed above the specimen 22 and stage 10 so that the light rays passing through the lens 50 are reflected by the inclined mirror 52 to the inclined mirror 54. The mirror 54 reflects the light rays downwardly to the mirror 56 which directs the rays to the optical element 60. The mirrors 52, 54 and 56 are of gradually increasing size to allow for the expanding light rays to be totally reflected by each successive mirror. It should be understood that the beam deviater may take on other forms such as prisms, mirrors or combinations thereof without departing from the scope of the invention. The beam deviater provides an unreverted erect image when used in combination with an optical element according to the present invention.

Figure 4:
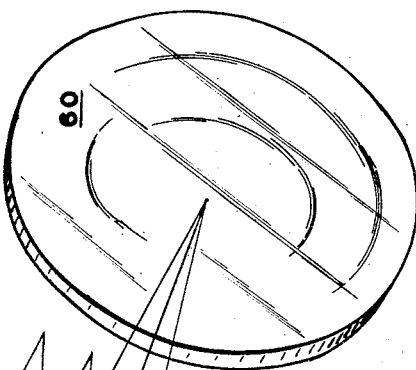
FIG. 4 is a schematic illustration taken in perspective of the optical system used in the magnifier shown in FIGS. 1 and 2; and, FIG. 5 is a schematic cross sectional view showing the incident and reflected ray paths of an optical element such as the one shown in FIG. 3.
Figure 4:
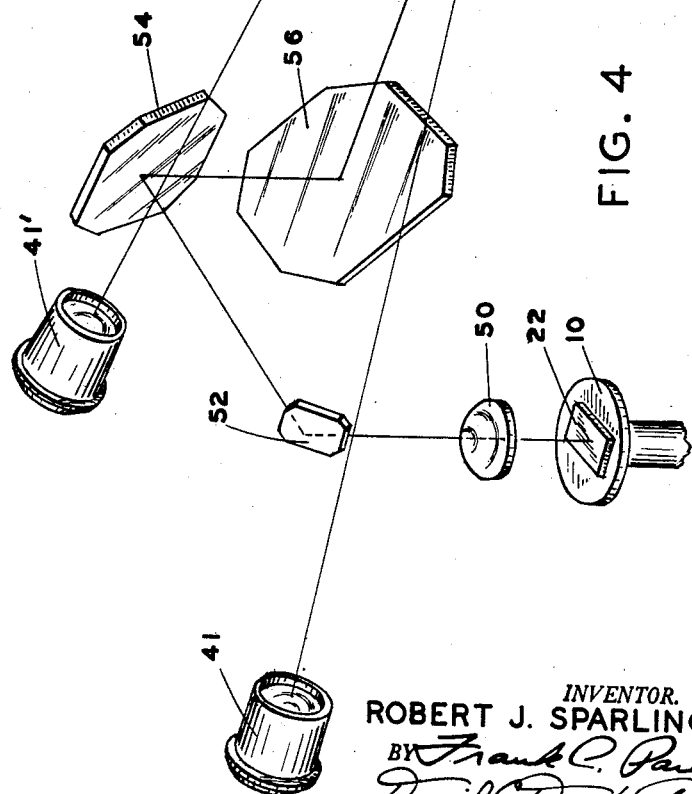

A pair of eyepieces 41, 41' shown in FIG. 4 may be inserted in the apertures 40. In some cases it may be desirable to include the eyepieces 41 in order to correct for aberrations, form an image at a suitable distance from the aperture and to seal the unit to thereby minimize the tendency of dirt entering the system.

The mirrors 52, 54, 56 and lens 50 are mounted within the supporting means 30. The mirror 56 including a mounting bracket 57 is fixed to a bracket 32 by means of the screws 33, 33'. An adjusting screw 35 is threadedly received within the bracket 32 and adapted for making minor adjustments in the position of the mirror 36. The lens 50 and mirror 52 are mounted to the wall 30' by means of screws 31, 31', 32, 32' and 33. The mirror 54 is mounted on the opposite side of the device by means of screws 52', 53, 53'.

The optical element 60 is mounted in mounting means 62 which forms a backing plate therefor. The mounting means 62 is fixed to a member 64 by means of screws 68. This assembly is fixed to a bracket 66 which in turn is fixed to the member 34. The assembly may be adjusted by an adjusting screw 69 which is threadedly received in the member 66 and comes into contact with the member 34.

Figure 5:
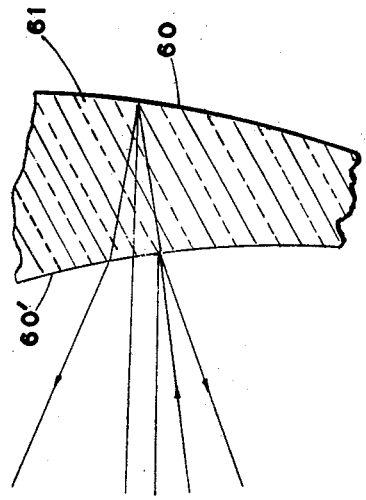

The element 60 is shown more clearly in FIGS. 3, 4 and 5. The element 60 includes two optical surfaces 60' and 61. The surface 60' has a semi-transparent coating thereon and is concave with respect to an incident light ray. The second surface 61 is convex and has a reflective coating thereon. The reflective coating forms a concave reflector for light rays which are transmitted by the semi-transparent coating. An incident light ray designated in FIG. 5 is partially reflected by the surface 60'. The light reflected by the coating 60 follows the optical path A shown in FIGS. 4 and 5. The light transmitted by the coating 60' is refracted by and passes through the element 60. This portion of incident light is reflected by the second surface 61 along an optical path B. The two optical paths A and B diverge and form similar images which may be viewed through the apertures 40 to thereby give the effect of stereoscopic viewing.

A presently preferred embodiment of the invention incorporates an optical element having a diameter approximately equal to 6.5". The surface 60' has a semi-transparent coating thereon which reflects 36% of the incident light and transmits 64% of the incident light. The second surface 61 has an aluminum coating which reflects substantially all of the light transmitted by the first surface 60'. In the presently preferred embodiment each of the surfaces is spherical and each has a radius equal to 16.56".

The two surfaces 60', 61 form an eccentric element of increasing thickness. The eccentricity of the presently preferred element is characterized by a difference in edge thickness equal to approximately 0.46 inch. This difference results from subtracting the smaller thickness which is equal to .158 inch from the larger thickness which is equal to 0.61 inch. It should be understood however that numerous changes and modifications may be made in the present dimensions without departing from the spirit or the scope of the invention. It should also be understood that changes in the optical conjugates may be obtained by changing the radii of the element or by changing the optical conjugates or optical elements in the system.

The semi-transparent coating comprises a relatively thin layer of vacuum deposited metal. It has been found however that in the present application multi-layer films may be used, such as neutral beam dividers, see for example the catalog entitled "Bausch & Lomb Multi-Layer Films" distributed by Bausch & Lomb Incorporated, Rochester, New York.

The reflective coating is a relatively thick or opaque layer of aluminum or the like which according to the preferred embodiment of the invention is applied by conventional vacuum techniques.

What is claimed is:

A magnifier or the like comprising the combination of a stage and a lens for forming an image of a specimen on said stage, an optical element including two curved surfaces defining a concave convex element of increasing thickness, said surfaces having approximately equal radii, and said element including a semi-transparent coating which reflects approximately 36% of incident light rays disposed on said concave surface and a reflective coating disposed on said convex surface, a beam deviator including three inclined mirrors directing the imaging light rays from said lens toward said element whereby the light rays impinging on the concave surface of said element are partially reflected by said semi-transparent coating and the transmitted portion of the rays is reflected by said reflective coating and means including said beam deviator, said optical element forming a pair of magnified unreverted erect images in space.

References Cited by the Examiner

UNITED STATES PATENTS

| | | | |
|---|---|---|---|
| 1,007,346 | 10/11 | Fery | 88—14 |
| 2,455,818 | 12/48 | Sherts | 88—77 |
| 2,579,177 | 12/51 | Miles | 88—74 X |
| 3,114,149 | 12/63 | Jessen. | |

DAVID H. RUBIN, *Primary Examiner.*